United States Patent
Lliev

(10) Patent No.: US 7,412,008 B2
(45) Date of Patent: Aug. 12, 2008

(54) PROGRAMMABLE PHASE MAPPING AND PHASE ROTATION MODULATOR AND METHOD

(75) Inventor: Nickolai J. Lliev, Park City, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 744 days.

(21) Appl. No.: 10/610,116

(22) Filed: Jun. 30, 2003

(65) Prior Publication Data
US 2004/0264599 A1 Dec. 30, 2004

(51) Int. Cl.
*H04L 27/36* (2006.01)
(52) U.S. Cl. .................. 375/298; 375/261; 375/279; 375/372; 332/103; 332/104
(58) Field of Classification Search ............ 375/298, 375/353, 261, 279, 372; 332/103, 104
See application file for complete search history.

(56) References Cited

U.S. PATENT DOCUMENTS

| | | | |
|---|---|---|---|
| 4,562,415 A | 12/1985 | McBiles | |
| 5,960,040 A | 9/1999 | Cai et al. | |
| 6,396,869 B1* | 5/2002 | Park et al. | 375/146 |
| 6,836,515 B1* | 12/2004 | Kay et al. | 375/260 |
| 6,865,235 B2* | 3/2005 | Khoini-Poorfard | 375/272 |
| 2003/0095608 A1* | 5/2003 | Duperray | 375/297 |

OTHER PUBLICATIONS

Dimitrios Karampatsis, Joao Lima Pinto, Izzat Darwazeh, Transmitter Modeling and EVM Estimation for the GSM Evolution- EDGE, Manchester, U.K., (undated), University of Manchester.

Wolfgang H. Gerstacker, Robert Schober, Equalization Concepts for Edge, IEEE Transactions on Wireless Communications, Jan. 2002, pp. 190-199, vol. 1, No. 1, 1536-1276/02$17.00, Germany.

Slimane Ben Slimane, An Improved PSK Scheme for Fading Channels, Stockholm Sweden, (undated), Royal Institute of Technology.

Texas Instruments, Application Note GC2011-AN9804, Upconverting Signals With The GC2011 For Easier Digital To Analog Conversion, Dec. 20, 1998, pp. 1-38, Dallas, Texas.

Marta Iglesias-Xamani, Hybrid-Phase-Shift Keying Proposed for 3G Systems, Wireless Systems Designs, Jan. 2000, pp. 24-32.

Jack Browne, System Simulator Melds, DSP and RF Anaysis, Microwaves & RF, Feb. 2002, pp. 116-121.

Motorola, Product Review MC 13779-3G/D, Rev. 0.3, Mar. 2003, pp. 1-26.

* cited by examiner

*Primary Examiner*—Ted Wang
(74) *Attorney, Agent, or Firm*—Vedder Price P.C.

(57) ABSTRACT

A modulator (10) and method provides a programmable phase rotation for supporting different modulation formats and different phase rotations. The modulator (10) includes a programmable symbol counter (32) and symbol phase rotation logic (31) operatively responsive to programmable phase rotation size data (36) and programmable counter size data (30). The modulator (10) can be used to communicate with different modulation formats employing different phase rotation conventions as used in different communication systems. The symbol phase rotation logic (31) produces rotated in-phase data (20) and rotated quadrature data (22) in response to receiving at least received symbol data (24), programmable phase rotation size data (36), and symbol count data (32) based on programmable counter size data (30). According to another embodiment, the phase rotations of the modulator (10) may be dynamically selectable such that the phase rotations may be selected to accommodate changes in channel characteristics in real time.

21 Claims, 4 Drawing Sheets

PROGRAMMABLE PHASE MAPPING AND PHASE ROTATION MODULATOR AND METHOD

FIELD OF THE INVENTION

The invention relates generally to modulators and, more particularly, to phase shift keyed modulators.

BACKGROUND OF THE INVENTION

Modulators typically modulate baseband data prior to transmission by a radio transmitter in response to receiving the baseband data from a baseband processor. As used herein, modulation of baseband data also refers to encoding of the baseband data if required. Accordingly, a modulator converts the baseband signal into a symbol, based on a mapping of the baseband data into one of a set of symbols as part of the process of modulating the baseband signal. For example, phase shift keyed (PSK) modulators are known to receive symbol data and to convert the symbol data into phase data using M-phase PSK modulation, where M represents the number of possible phases corresponding to the size of the symbol set.

According to one method, a modulator maps three consecutive bits of data from a baseband processor into one of eight symbols in an 8 phase PSK (8PSK) modulation format known as Gray coding. However, phase transitions for sequentially adjacent phase symbols that are 180 degrees, or π radians out of phase, exhibit zero crossings on a phase signal constellation map. Sequentially adjacent phase shift keyed signals that exhibit zero crossings in the phase signal constellation map create higher bandwidth signal components, such as intermodulation signals and other spurious signals, as opposed to sequentially adjacent signals that do not cross zero in the phase constellation map. As a result, phase shift keyed signals that exhibit zero crossings require the use of a very linear power amplifier in order to transmit the large bandwidth modulated signal.

Phase shift keyed signal transitions for sequentially adjacent phase symbols that exhibit zero crossings in the phase signal constellation map also result in a high peak to average and high peak to minimum power ratio compared to signal transitions that do not cross zero in the phase signal constellation map. Modulated signals with a high peak to average and high peak to minimum power ratio may saturate a power amplifier, creating greater interference noise in adjacent channels of a communication system. The interference noise in adjacent channels can reduce communication system capacity.

According to a second method, to minimize saturation of the power amplifier as a result of a modulated signal with a high peak to average and peak to minimum power ratio, the operating region of the power amplifier is reduced, which in turn reduces the power amplifier efficiency and further increases power consumption of the power amplifier. Consequently, modulated signals with high peak to average and peak to minimum power ratios require large bandwidths and additional power to operate, resulting in, for example, reduced battery life in a wireless device.

According to a third method, each symbol may be rotated when mapping the baseband data to a symbol; for example, each symbol may be rotated by a multiple of a predetermined phase rotation amount when using M-phase PSK modulation. This phase rotation reduces the zero crossings on the phase signal constellation map for sequentially adjacent phase modulated symbols, resulting in a modulated signal with reduced bandwidth and a reduction in the peak to average and peak to minimum power ratio of phase modulated signal. However, the phase rotation amount is not programmable in the modulator and, as a result, remains fixed. Consequently, this type of modulator cannot be used to communicate with modulation formats of different phase rotations, as used in different communication systems.

According to a fourth method, each symbol may be rotated by adding a fixed number to the symbol data to form a rotated symbol. The rotated symbol is then converted to an amount of rotation as a phase angle via lookup table. However, the rotation amount is not based on a symbol count to ensure that sequentially adjacent phase symbols do not exhibit zero crossings on a phase signal constellation map. Rather, the rotation amount is derived by adding a fixed number to each symbol received in the symbol data. Additionally, the rotation amount is not programmable in the modulator. Consequently, this type of modulator cannot be used to communicate with modulation formats of different phase rotations, as used in different communication systems.

BRIEF DESCRIPTION OF THE DRAWINGS

The present invention is illustrated by way of example and not limitation in the accompanying figures, in which like reference numerals indicate similar elements, and in which.

DETAILED DESCRIPTION OF THE PREFERRED EMBODIMENT

Figure 1:
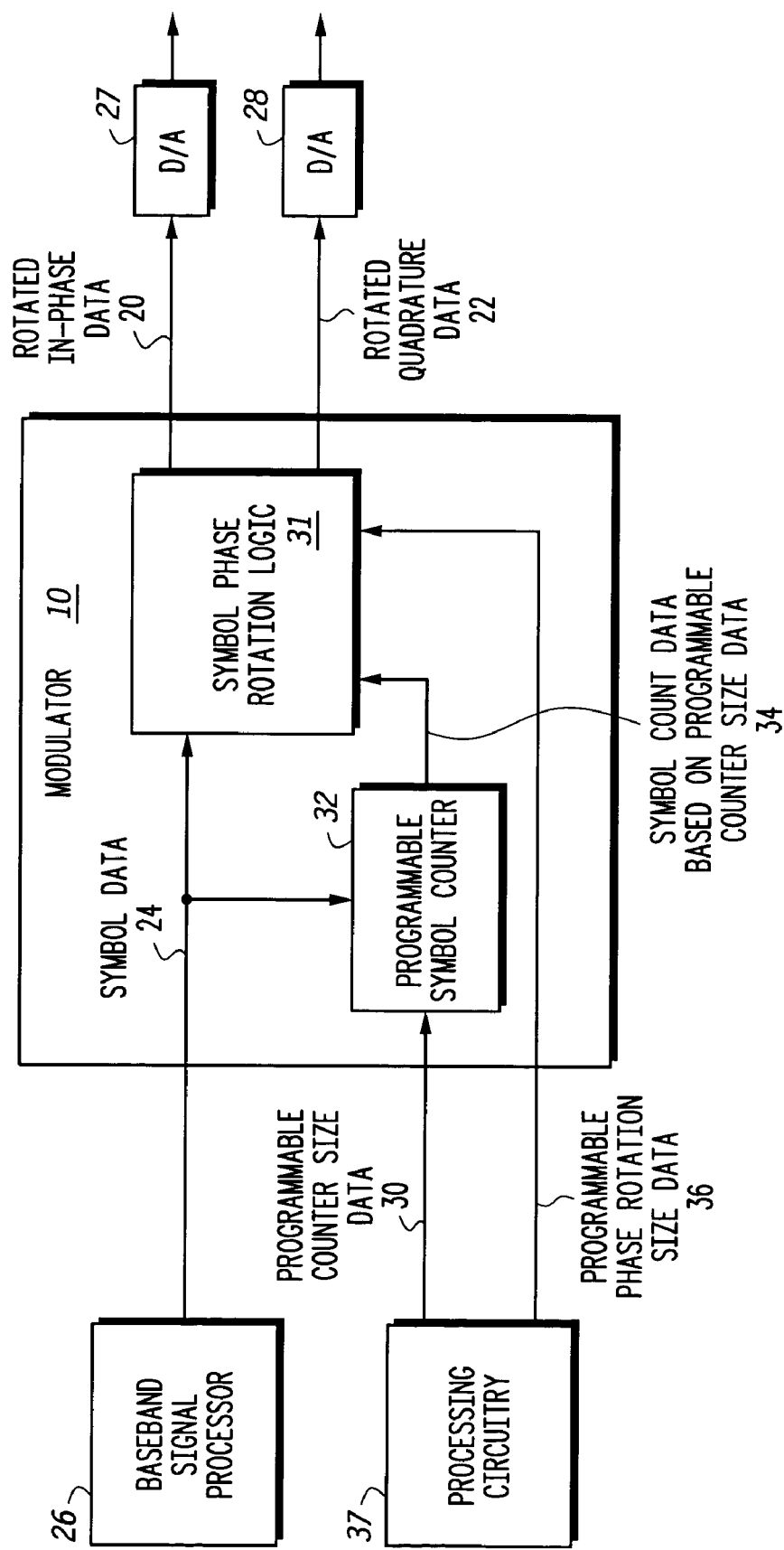
FIG. 1 is a block diagram illustrating one example of a modulator according to one embodiment of the invention.

A modulator and method provides a programmable phase rotation for supporting different modulation formats and different phase rotations. The modulator employs a symbol phase rotation logic and a programmable symbol counter that is operatively responsive to programmable phase rotation size data and programmable counter size data. Programmable phase rotation data determines an amount of phase rotation and programmable counter size data determines the maximum counter size. Accordingly, the modulator can be used to communicate with different modulation formats employing different phase rotation conventions as used in different communication systems.

The symbol phase rotation logic is operative to produce rotated in-phase data and rotated quadrature data in response to receiving at least received symbol data, programmable phase rotation size data, and symbol count data based on programmable symbol counter size data. For example, the symbol phase rotation logic may include processing circuitry and associated memory that contains executable instructions for accessing a lookup table to produce the rotated in-phase data and the rotated quadrature data in response to receiving at least the received symbol data 24, the symbol count data 34 based on the programmable counter size data 30 and the programmable phase rotation size data 36. According to another embodiment, the symbol phase rotation logic may produce dynamically selectable phase rotations that may be selected to better accommodate changes in channel characteristics in real time.

According to one exemplary embodiment, the modulator may be programmed to provide phase angle rotations for a phase shift key system capable of multiple phase modulation formats, using M-phase PSK, where M represents the number of possible phases corresponding to the size of the symbol set. Additionally, the modulator may support multiple modulation formats without requiring separate multiple dedicated modulators. Thus, a wireless device capable of functioning in multiple modulation formats may benefit from, among other things, the reduced size of using a single modulator as opposed to using multiple dedicated modulators. Further, the reduction of circuitry required for a single programmable multimode modulator may decrease power consumption for the wireless device.

According to another embodiment, the modulator may support multiple third generation (3 G) mobile communication systems, such as a universal mobile telecommunications service (UMTS) system, and an enhanced data rates for GSM evolution (EDGE) system. UMTS is based on wide band code division multiple access (WCDMA) technology. EDGE has evolved from the existing time division multiple access (TDMA) standard of Global System for Mobile communications (GSM). EDGE improves spectral efficiency by applying the 8-phase QSK modulation format instead of binary Gaussian minimum-shift keying (GMSK), which is used in GSM. Furthermore, the modulator may be designed to receive high input symbol data rates, thus allowing the modulator to be programmed for any existing or future modulation formats, including any communication standards to be developed in the future.

A method for programming the modulator to produce programmable rotated in-phase data and rotated quadrature data in order to support communications with different modulation formats and different phase rotations. The modulator receives symbol data representing a series of received symbols. The programmable symbol counter produces symbol count data based at least on programmable symbol counter size data in response to receiving each of the symbols. Accordingly, the symbol phase rotation logic is programmed to produce the rotated in-phase data and the rotated quadrature data for each of the received symbols.

FIG. 1 is a block diagram illustrating one example of a modulator 10 operative to produce rotated in-phase data 20 and rotated quadrature data 22 in response to receiving symbol data 24, for example, from a baseband signal processor 26. The modulator 10 may be coupled to digital to analog converters (D/A) 27 and 28 to convert the rotated in-phase data 20 and rotated quadrature data 22 into analog signals. The modulator 10 includes symbol phase rotation logic 31 operatively coupled to a programmable symbol counter 32. The programmable symbol counter 32 receives the received symbol data 24, and programmable counter size data 30 to produce symbol count data 34. For example, the programmable symbol counter 32 may count sequentially up to the programmable counter size data 30 to produce symbol count data 34.

Symbol phase rotation logic 31 receives the received symbol data 24 and programmable phase rotation size data 36 from processing circuitry 37. For example, processing circuitry 37 may be part of a wireless device and may program the programmable symbol counter 32 with programmable counter size data 30, and processing circuitry 37 may program the symbol phase rotation logic 31 with programmable phase rotation size data 36, based on the modulation format and programmable phase rotation required for communication within a wireless communication system.

Symbol phase rotation logic 31 is operative to produce the rotated in-phase data 20 and the rotated quadrature data 22 in response to receiving at least the received symbol data 24, the symbol count data 34 based on the programmable counter size data 30, and the programmable phase rotation size data 36. For example, symbol phase rotation logic 31 may be an ASIC, dedicated arithmetic circuit including adders, subtractors, shift logic, and control logic to covert digital symbol data 24 into the rotated in-phase data 20 and the rotated quadrature data 22. Additionally, symbol phase rotation logic 31 may be one or more suitably programmed microprocessors, microcontrollers, DSPs (digital signal processors), or other processing circuitry, or any suitable combination of hardware, software, or firmware, and may include associated memory that contains a lookup table and executable instructions that, when executed, produce the rotated in-phase data 20 and the rotated quadrature data 22 in response to the lookup table receiving at least the received symbol data 24, the symbol count data 34, based on the programmable counter size data 30, and the programmable phase rotation size data 36.

As previously stated, the programmable counter size data 30 and the programmable phase rotation size data 36 allow the modulator 10 to be programmed to support different phase rotations and different modulation formats. The modulator 10 may support multiple modulation formats by programming the programmable symbol counter 32 with programmable counter size data 30 and by programming the symbol phase rotation logic 31 with programmable phase rotation size data 36. For example, the particular modulation format and phase rotation may be determined or detected by the processing circuitry 37 within; for example, a wireless device based on the modulation format required for communication within a particular wireless communication system. Accordingly, the processing circuitry 37 may program the symbol phase rotation logic 31 with the programmable counter size data 30 and the programmable phase rotation size data 36 by determining the required modulation format and phase rotation. As a result, the modulator 10 can be used to communicate with modulation formats of different phase rotations as used in different communication systems.

According to one embodiment, the symbol phase rotation logic 31 produces substantially no zero crossings on a constellation phase map for sequentially adjacent rotated in-phase data 20 and rotated quadrature data 22, based on at least the programmable phase rotation size data 36. For example, in an eight-phase PSK modulation system, rotating each received symbol by the programmable phase rotation size data 36 equivalent to an integral multiple of $$\frac{3\pi \times N}{8}$$

radians, where N is the symbol count data 34, substantially reduces or eliminates zero crossings on a constellation phase map for sequentially adjacent rotated in-phase data 20 and rotated quadrature data 22. As previously stated, phase shift keyed signals that do not exhibit zero crossings in the phase signal constellation map create lower bandwidth signals than signals that cross zero in the phase constellation map. Additionally, signals that do not cross zero on a constellation phase map produce less distortion and produce less error when demodulating a phase shift keyed signal than signals that exhibit zero crossing the phase signal constellation map. Additionally, the linearity requirements of a power amplifier that does not process signals that cross zero on a constellation phase map are less stringent due to the improved spectral efficiency.

The symbol phase rotation logic 31 dynamically varies a phase rotation of the rotated in-phase data 20 and a phase rotation of the rotated quadrature data 22 in response to at least a change in the programmable phase rotation size data 36, and a change in the symbol count data 34, based on the programmable counter size data 30. According to one exemplary embodiment, the programmable phase rotation size data 36 may be changed dynamically during a communication, such as during a telephone call, to better accommodate changes in channel characteristics in real time. Changes in channel characteristics may affect the quality of the communication channel.

According to another embodiment, the symbol phase rotation logic 31 produces rotated in-phase data 20 and rotated quadrature data 22, having phase transitions for sequentially adjacent phase symbols that have reduced zero crossings on a phase signal constellation map. For example, according to this embodiment, phase shift key signals that exhibit reduced zero crossings in the phase signal constellation map create reduced bandwidth signals and reduced peak to average and peak to minimum power ratios, as opposed to signals that more frequently cross zero in the phase constellation map. According to this embodiment, the hardware and software required to produce the phase rotation may be simplified, thus reducing the cost and expense of developing the symbol phase rotation logic 31 to produce no zero crossings in the phase constellation map, while realizing some benefit such as reduced bandwidth.

The baseband processing circuit 26 produces baseband digital data for conversion into symbol data 24, based on grouping a predetermined number of bits from the baseband digital data and associating the grouped bits into a symbol selected from a predetermined set of symbols, as known in the art. The baseband signal processor 26 may provide the symbol data 24 in any suitable format, such as serial data, or parallel data. Further, the baseband signal processor 26 may parse the baseband digital data, for example, in sequential groups of three bits, where each group of three bits represents one symbol from a set size of eight symbols.

According to one embodiment, the received symbol data 24 may be selected from a group of M symbols where the symbol phase rotation logic 31 represents each of the symbols as one of M possible phases. M may be an integer that represents the number of possible phases corresponding to the size of the symbol set. According to one embodiment, the programmable counter size data 30 is based on at least M, such as 2 M, so that the symbol counter size is associated with the number of possible phases. The programmable phase rotation size data 36, according to this embodiment, is based on at least M, so that the number of phase rotations is associated with the number of possible phases and the symbol counter size. Accordingly, each symbol received from the symbol data 24 may be mapped to one of M possible phase angles, and rotated by a programmable amount determined by the programmable phase rotation size data 36. This allows a programmable phase angle rotation for each of the received M-phase PSK symbols, based at least on the symbol count data 34.

According to another embodiment, the programmable counter size data 30 may be based on a power of two, such as two, four, eight, sixteen, thirty-two, sixty-four, and so on. Alternatively, the counter size data 30 may be any suitable number not necessarily based on a power of two. For example, if M equals eight, the programmable phase rotation size data 34 may be sixteen or even a number other than sixteen, such as ten, eleven, or twenty, or any other suitable number.

According to the embodiment where the symbol size set M equals eight, the symbol data is represented as a sequence of symbols, each corresponding to one out of at least eight possible phases. In this example, the phase rotation for each symbol is an integral multiple N of the programmable phase rotation size data 36, such as a multiple of $$\frac{3\pi \times N}{8},$$

where the integral multiple N is the symbol count data 34. The programmable symbol counter 32 produces a symbol count 34, N, that is used as a multiplier to the programmable phase rotation size data 36. For example, if the programmable symbol counter 32 has a current symbol count data 34 of six, then the symbol phase rotation logic 31 will produce a rotation by multiplying the symbol count data 34, six in this example, with the programmable phase rotation size data 36, $3\pi/8$ radians, in this example, to produce a rotation amount of $$\frac{3\pi \times 6}{8}$$

radians.

According to one embodiment, the programmable symbol counter 32 may be a wrap-around counter such that as each symbol from the symbol data 24 is received, the programmable symbol counter 32 will count from zero to a maximum number established by the programmable counter size data 30. For example, if the programmable counter size data 30 is fifteen, then the programmable symbol counter 32 will count from zero to fifteen and then wrap around to zero after the next symbol is received. According to another embodiment, the programmable symbol counter 32 may be a shift register, suitable pattern generator, or suitable logic for providing symbol count data 34 to symbol phase rotation logic 31.

Figure 2:
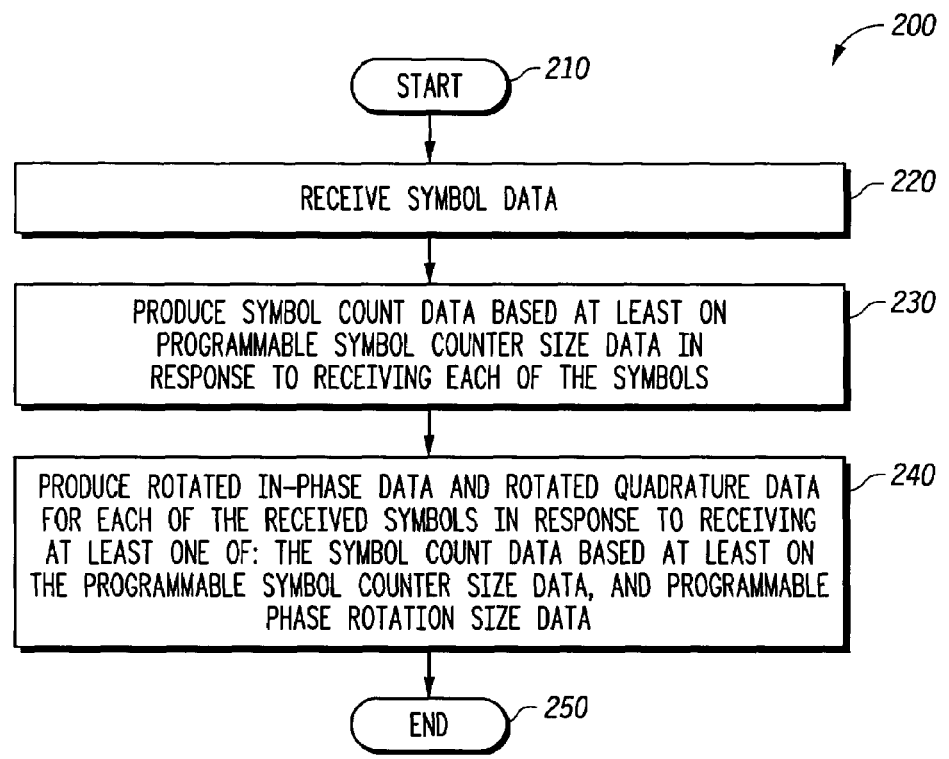
FIG. 2 is a flow chart illustrating one example of a programmable phase mapping method according to one embodiment of the invention.

FIG. 2 illustrates a method 200 beginning with step 210 for producing rotated in-phase data 20 and rotated quadrature data 22. The method 200 will be described with respect to FIG. 1, but is not limited thereto. The method 200 may be carried out by the modulator 10. However, any other suitable structure may also be used. It will be recognized that the method 200 will be described as a series of operations, but the operations may be performed in any suitable order. Modulator 10 at step 220 receives symbol data 24 representing a series of received symbols. For example, baseband signal processor 26 may receive baseband data, either serially or in parallel, and convert the baseband data into one of a set of M symbols to generate the symbol data 24 as known in the art. According to one embodiment, the baseband signal processor 26 may parse the baseband digital data based on successive groupings of bits associated with a symbol within the symbol set size M. For example, in eight-phase PSK modulation, the baseband processor 26 may group successive groups of three bits or may parse successive groups of three bits in order to convert each group of three bits into one of eight symbols through a bit to symbol mapping function.

At step 230, programmable symbol counter 32 produces symbol count data 34 based at least on programmable counter size data 30 in response to receiving each of the symbols from the symbol data 24. As previously discussed with reference to FIG. 1, the programmable symbol counter 32 may sequentially count the number of symbols received in the symbol data 24 to produce the symbol count data 34 up to the programmable counter size data 30, in response to receiving each of the symbols within the predefined symbol set.

For example, the generation of the symbol count data 34 at step 230, based on programmable counter size data 30, may be performed by counting each of the received symbols from received symbol data 24 to produce corresponding symbol count data 34. The symbol count data 34 may be compared to the programmable counter size data 30 each time a symbol in the symbol data 24 is received. If the symbol count data 34 is equal to the programmable counter size data 30, then the symbol count data 34 may be reset to an initial symbol count value, such as zero. Using the eight-phase PSK modulation example, the programmable counter size data 30 is, for example, fifteen. Accordingly, the symbol count data 34 will count from zero to fifteen for every symbol received in the symbol data 24. Once the symbol count data 34 equals the programmable counter size data 30, then the symbol count data 34 is reset to zero, or the symbol count data 34 wraps around to zero. If the symbol count data 34 is not equal to the programmable counter size data 30, then the symbol count data 34 is incremented as previously described.

At step 240, symbol phase rotation logic 31 produces the rotated in-phase data 20 and the rotated quadrature data 22 in response to receiving a corresponding symbol out of the symbol set M from the received symbol data 24, the corresponding symbol count data 34 based on the programmable counter size data 30, and the programmable phase rotation size data 36. Accordingly, each symbol received as part of the received symbol data 24 will be ultimately converted to rotated in-phase data 20 and rotated quadrature data 22. As a result of no, or the reduced number of zero, crossings, the bandwidth is reduced for the resulting signal represented by the rotated in-phase data 20 and the rotated quadrature data 22. Further, the peak to average and the peak to minimum power is reduced, as compared to the unrotated in-phase data 50 and the unrotated quadrature data 52. According to another embodiment, a phase rotation of the rotated in-phase data 20 and a phase rotation of the rotated quadrature data 22 is dynamically varied in response to any change of the programmable phase rotation size data 36 and any change in the symbol count data 34 based the programmable symbol counter size data 36.

Figure 3:
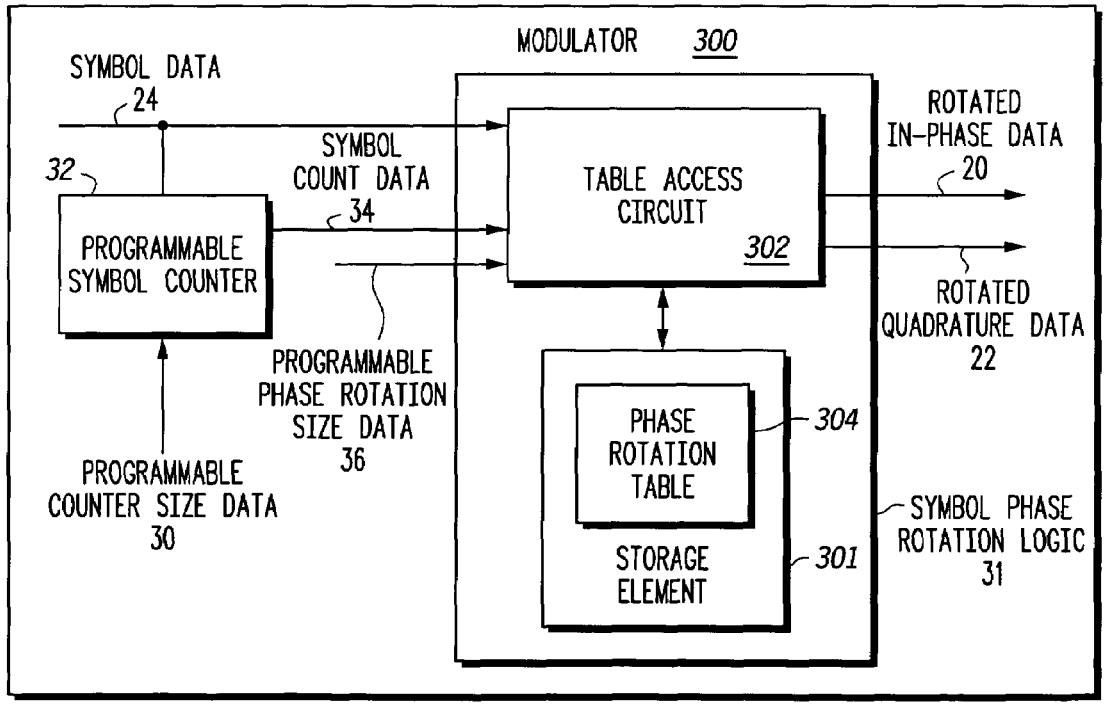
FIG. 3 is a block diagram illustrating an exemplary modulator including a table access circuit, according to another embodiment of the invention.

FIG. 3 illustrates a modulator 300 according to one exemplary embodiment of the invention. The symbol phase rotation logic 31 includes a storage element 301, such as a memory device, operatively coupled to a table access circuit 302. The storage element 40 includes data representing a phase rotation table 304 containing at least the rotated in-phase data 20 and the rotated quadrature data 22 for rotating a phase associated with at least the received symbol data 24.

The table access circuit 302 produces the rotated in-phase data 20, and the rotated quadrature data 22, in response to the symbol data 24, and a rotation amount received from the phase rotation table 304 of storage element 301. According to one embodiment, a phase rotation is applied to the symbol data 24, in response to the symbol count data 34, the programmable counter size data 30, and the programmable phase rotation size data 36. Using the previous 8-phase PSK modulation example, where the symbol count data 24 is six, and the programmable phase rotation size data 36 is $$\frac{3\pi}{8},$$

the phase rotation amount is $$\frac{3\pi \times 6}{8}.$$

Accordingly, the size of phase rotation table 304 is such that the symbol data 24 may be converted to a rotated phase for any symbol in the symbol set and for any combination of programmable phase rotation size data 36, symbol count data 34, and programmable counter size data 30. According to one embodiment, phase rotation table 304 is at least a three dimensional lookup table that provides a rotation amount based on any combination of programmable phase rotation size data 36, symbol count data 34, and programmable counter size data 30.

According to one embodiment, the phase rotation table 304 may be programmed to produce substantially no zero crossings, or a reduced number of zero crossings on a constellation phase map for sequentially adjacent rotated in-phase data 20 and rotated quadrature data 22. For example, as known in the art in an eight-phase PSK modulation system, rotating each received symbol by an integral multiple of $$\frac{3\pi \times N}{8}$$

radians, where N is the symbol count data 34, substantially reduces or eliminates zero crossings on a constellation phase map for sequentially adjacent rotated in-phase data 20 and rotated quadrature data 22.

The table access circuit 302 and the phase rotation table 304 convert each individual symbol from symbol data 24 to produce the required rotated in-phase data 20 and the rotated quadrature data 22. For example, in response to the symbol data 24, the table access circuit 302 obtains a rotation amount to produce the rotated in-phase data 20 and a rotation amount to produce the rotated quadrature data 22 stored in storage element 40. The rotation amounts necessary to produce the rotated in-phase data 20 and the rotated quadrature data 22 may be stored in storage element 40 using any suitable coordinate system, such as a Cartesian coordinate system or a polar coordinate system. Rotation amounts to produce the rotated in-phase data 20 and rotated quadrature data 22 may be represented in the polar coordinate system simply as an angle, where the magnitude for each data entry is unity, and as such, does not change unless the phase data is amplitude modulated. The table size, if using Cartesian coordinates, would include real and imaginary entries corresponding to in-phase and quadrature rotation amount data.

According to one embodiment, the table access circuit 302 is capable of converting any symbol from a plurality of symbol sets M for any possible symbol count data 34, based on a plurality of programmable counter size data 30, and a plurality of programmable phase rotation size data 36. Accordingly, the table access circuit 302 is capable of dynamically varying a phase rotation of the rotated in-phase data 20 and a phase rotation of the rotated quadrature data 22, in response to any changes in the programmable phase rotation size data 36, any changes in the symbol count data 34, and any changes on the programmable counter size data 30. As a result, the table access circuit 302 may be programmed to allow a switch from one modulation format to any other type of modulation format, such as, for example, GSM, EDGE, CDMA and UMTS or any suitable existing or future modulation format.

Although the symbol phase rotation logic 31 was described above as being a table access circuit 302 and a storage element 301 having a phase rotation table 304, it will be recognized that the symbol phase rotation logic 31 may be implemented using any logic such as discrete logic, an ASIC, or a DSP programmed to produce the rotated in-phase data 20 and the rotated quadrature data 22, such that substantially no zero crossings occur, or a reduced number of zero crossings occur, on a constellation phase map for sequentially adjacent rotated in-phase data 20 and rotated quadrature data 22, or any suitable sequence of data.

Figure 4:
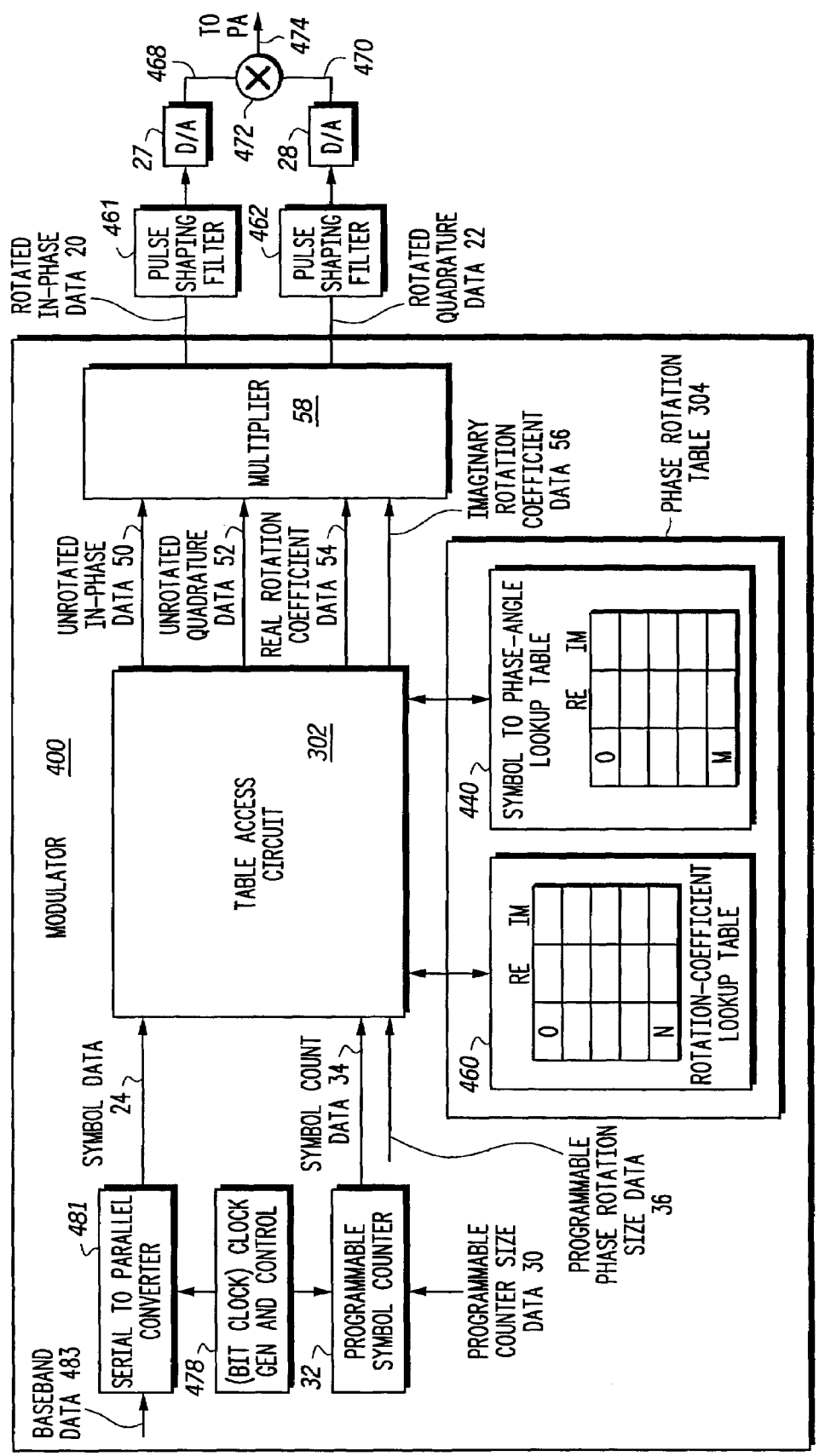
FIG. 4 is a block diagram illustrating another exemplary modulator including a rotation coefficient lookup table, according to yet another embodiment of the invention.

FIG. 4 illustrates a modulator 400 according to another exemplary embodiment, where the phase rotation table 304 further includes a symbol to phase angle lookup table 440 and a rotation coefficient lookup table 460. The symbol to phase angle lookup table 440 contains at least unrotated in-phase data 50 and unrotated quadrature data 52 corresponding to the received symbol data 34. Accordingly, the symbol to phase angle lookup table 440 contains entries for each possible symbol in the symbol set, i.e., M for an M-phase PSK modulation format as known in the art. The symbol to phase angle lookup table 440 contains real and imaginary entries in a Cartesian coordinate system, however, any coordinate system such as a polar coordinate system or any other suitable coordinate system may be used as previously discussed. Similarly, rotation coefficient lookup table 460 contains at least real rotation coefficient data 54 and imaginary rotation coefficient data 56 in, for example, a Cartesian or polar coordinate system or other suitable system corresponding to the received symbol count data 34 based at least on the programmable counter size data 30.

The table access circuit 302 produces the rotated in-phase data 20 and the rotated quadrature data 22, in response to receiving the unrotated in-phase data 50 and unrotated quadrature data 52 from the symbol to phase angle lookup table 440, and in response to receiving the real rotation coefficient data 54 and the imaginary rotation coefficient data 56 from the rotation coefficient lookup table 460. For example, the table access circuit 302 may multiply the unrotated in-phase data 50 and unrotated quadrature data 52 with the real rotation coefficient data 54, and the imaginary rotation coefficient data 56 using, for example, a DSP programmed to perform the multiplication, or logic such as an ASIC, or any other suitable device or method.

The symbol to phase angle lookup table 440 and the rotation coefficient lookup table 460 contain entries for producing rotated in-phase data 20 and rotated quadrature data 22 for any anticipated combination of symbol data 24, programmable phase rotation size data 36, symbol count data 34 and programmable counter size data 30. Returning to the previous example where each symbol of symbol data 24 may be represented as one out of eight possible phases using eight-phase PSK modulation, the symbol to phase-angle lookup table 440 and rotation coefficient lookup table 460 may be programmed to provide one of sixteen phase positions on a constellation map for a symbol set size of eight. According to this embodiment, the programmable phase rotation size data 36 is $3\pi/8$. The size of the programmable counter size data 30 is at least fifteen so that the symbol count data 34 will count from zero to fifteen. As a result, the symbol count data 34 may be represented by four bits.

The symbol to phase angle lookup table 440 contains entries for converting each of the M symbols received from symbol data 24 into real unrotated in-phase data 50 and imaginary unrotated quadrature data 52 for each phase angle associated with a symbol. For example, using eight phase PSK modulation, there are eight symbols in the symbol set. Therefore, the symbol to phase angle lookup table 440 will have at least eight rows having real and imaginary entries representing the eight symbols in the symbol set. For example, the symbol value of two received from symbol data 24 would be represented in the phase angle look up table 440 as an unrotated phase angle of $\pi/2$ radians.

Since the number of rows for the rotation coefficient lookup table 460 corresponds to the counter size in this example, the number of rows corresponds directly with the programmable counter size data 30. In the above example, the rotation coefficient lookup table 460 represents a table having at least sixteen rows and two columns if the database is represented in a Cartesian coordinate system, one column for real numbers and one column for imaginary numbers. Therefore, each entry of the rotation coefficient lookup table 460 represents the real and imaginary part of a rotation amount based on the programmable counter size data 30 and the programmable phase rotation size data 36.

According to this embodiment, each entry in the rotation coefficient lookup table 460 may be determined by multiplying the programmable phase rotation size data 36 with the current symbol count data 34 associated with the incoming symbol from symbol data 24. For example, if a particular symbol received in symbol data 24 has associated with it a current symbol count data of two, then the symbol count data 34 points to the second row of the rotation coefficient lookup table 460 containing the product of the programmable phase rotation size data 36, in this case $$\frac{3\pi}{8}$$

radians, multiplied by a multiplier equivalent to the symbol count data 34, in this case two. As a result, the real rotation coefficient data 54 and the imaginary rotation coefficient data 56 for the corresponding received symbol corresponds to $$\frac{3\pi \times 2}{8} = \frac{3\pi}{4}$$

radians. In this example, the symbol value of two received from symbol data 24 corresponds to the unrotated phase angle of $\pi/2$ radians and is rotated by $3\pi/4$ radians resulting in a rotated phase angle of $5\pi/4$ radians or simply as $\pi/4$ radians in the constellation phase map.

According to another alternative embodiment, the rotation coefficient lookup table 460 and the symbol to phase angle lookup table 440 may contain entries for multiple values of programmable phase rotation size data 36, multiple values of programmable counter size data 30, and for multiple numbers of symbol size sets M. For example, the symbol to phase angle lookup table 440 may contain entries for symbol size sets of four, eight, sixteen, thirty-two, sixty-four, or any suitable symbol size set M. Returning to the previous example, the symbol to phase angle lookup table 440 provides phase angles for a symbol size set of eight and for a programmable counter size data 30 of sixteen. Additionally, the symbol to phase angle lookup table 440 may also provide phase angles for a symbol size set of sixteen and programmable counter size data of thirty-two. Accordingly, the symbol to phase angle lookup table 440 may have multiple sets or subsets of lookup tables in order to respond to any dynamic change of the symbol size set, the programmable phase rotation size data 36 and programmable counter size data 30.

The rotation coefficient lookup table 460 may have multiple sets or subsets of look up tables to provide rotation coefficients based on multiple programmable counter size data 30 and multiple programmable phase rotation size data 36. For example, the rotation coefficient lookup table 460 may have subtables corresponding to programmable counter size data 30 that may be of multiple sets of subtable values such as eight, sixteen, thirty-two, sixty-four, one hundred twenty-eight, two hundred fifty-six or any suitable value. Additionally, the rotation coefficient lookup table 460 may have multiple subtables for programmable phase rotation size data 36 such as $$\frac{3\pi}{8}, \frac{3\pi}{16}, \frac{3\pi}{32},$$

radians or any suitable value. According to one alternative embodiment, the programmable counter size data 30 is not based on a power of two and therefore may be any suitable number such as twenty, thirty-eight, sixty. As a result, the rotation coefficient lookup table 460 will provide the appropriate rotation coefficients based on the value of the programmable counter size data 30. Further, the rotation coefficient lookup table 460 may dynamically change the rotation coefficients based on any dynamic change of the programmable counter size data 30.

According to one embodiment, the actual rotation values within the rotation coefficient lookup table 460 may also be dynamically changed based on the programmable phase rotation size data 36. For example, one subtable of the rotation coefficient lookup table 460 may provide rotation values based on $$\frac{3\pi}{8}$$

radians whereas another subtable within the rotation coefficient lookup table 460 may provide a different rotation amount such as $$\frac{3\pi}{16}, \frac{3\pi}{32}$$

radians or any suitable rotation amount based on the change in the programmable phase rotation size data 36. As a result, multiple subtables within the rotation coefficient lookup table 460 and within the symbol to phase angle lookup table 440 may be predefined so that the table access circuit 302 may access any of the subtables dynamically based on any combination of symbol size set M, symbol count data 34, programmable counter size data 30, and programmable phase rotation size data 36.

According to another embodiment, modulator 10 includes a multiplier 58 operatively coupled to the table access circuit 302 to multiply the unrotated in-phase data 50 and the unrotated quadrature data 52 with real rotation coefficient data 54 and imaginary rotation coefficient data 56 to generate the rotated in-phase data 20 and the rotated quadrature data 22. Since the unrotated in-phase data 50, unrotated quadrature data 52 represents a complex number, and the real rotation coefficient data 54 and the imaginary rotation coefficient data 56 also represents a complex number, multiplier 58 performs complex multiplication as described according to one embodiment below. For example, multiplier 58 may perform the following complex multiplication as expressed in the formulas below.

(I+jQ)(RealC+jImC)

The unrotated in-phase data 50 is represented by I, the unrotated quadrature data 52 is represented by jQ, the real rotation coefficient data 54 is represented as RealC and the imaginary rotation coefficient data 56 is represented by jImC. The product of these two terms is shown below.

(IRealC+jIImC+jQRealC−QImC)

The real and imaginary parts are grouped together to produce the resulting equation for the rotated in-phase data 20 expressed as I Real C-Q ImC and the rotated quadrature data 22 expressed as j(IImC+QRealC)

IRealC−QImC+j(IImC+QRealC)

The multiplier 58 may be implemented in any suitable manner such as a dedicated complex multiplier hardware using, for example an ASIC, in software processed on a digital signal processor, microprocessor or any suitable processing circuit or, as with any combination of hardware or software.

According to another exemplary embodiment, the programmable symbol counter 32 may identify the occurrence of receiving either a group of baseband data 483 or a symbol from symbol data 24 by identifying the occurrence of a clock signal that corresponds to the receipt of a new symbol by a clock generation and control circuit 478. As shown in FIG. 4, an optional serial to parallel converter circuit 481 and the programmable symbol counter 32 receives a clock signal from the clock generation and control circuit 478 to identify the occurrence of receiving the baseband data 483 or a symbol within symbol data 24. As a result, the symbol count data 34 may be derived based on receiving a signal from the clock generation and control circuit 478 or, alternatively as previously described, by receiving the baseband data 483 or the symbol data 24.

As shown in FIG. 4, the rotated in-phase data 20 may be processed through pulse shaping filter 461, and the rotated quadrature data 22 may be processed by pulse shaping filter 462. Pulse shaping filters 461, 462 may be used to remove spurious signals and unwanted harmonics. The filtered rotated in-phase data 20 from the output of pulse shaping filter 461 may then be converted into an analog signal using D/A 27, and the rotated filtered quadrature data 22 from the output of pulse shaping filter 462 may be converted to an analog signal using D/A 28. The analog representation of rotated in-phase data 468 and the analog representation of rotated quadrature data 470 may then be combined in complex mixer 472 to produce a complex analog signal transmit for amplification by one or more power amplifiers.

Figure 5:
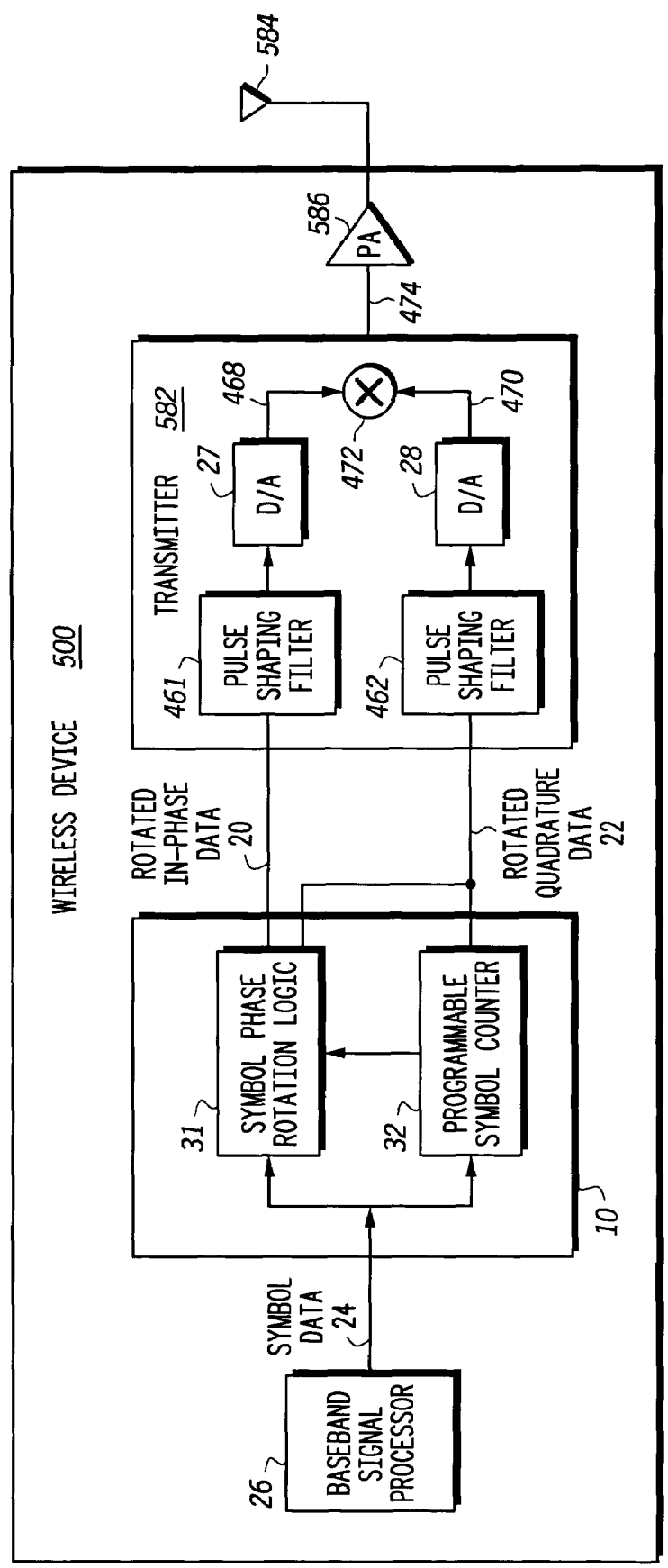
FIG. 5 is a block diagram illustrating one example of a wireless device according to an embodiment of the invention.

FIG. 5 is a block diagram of a wireless device 500, such as a cellular phone, personal digital assistant (PDA), pager or any suitable device. Wireless device 500 includes a baseband signal processor 26, the modulator 10 and a transmitter 582 coupled to an antenna 584 via optional power amplifier 586. The transmitter 582 is operatively coupled to the modulator 10 and to antenna 584 to transmit the rotated in-phase data 20 and rotated quadrature data 22. The transmitter 582 may include pulse shaping filters 461, 462 for pulse shaping the rotated in-phase data 20 and rotated quadrature data 22, and D/A converters 27, 28 for converting the pulse shaped rotated in-phase data 20 and rotated quadrature data 22 into the analog representation of rotated in-phase data 468, and the analog representation of rotated quadrature data 470.

According to one embodiment, transmitter 582 modulates a carrier frequency signal based on the rotated in-phase data 20 and rotated quadrature data 22 as known in the art. The modulation of the carrier frequency may occur at any suitable point in the transmitter 82, such as prior to D/A conversion by D/A converters 64, 66 for direct conversion of the rotated in-phase data 20 and rotated quadrature data 22 into a modulated carrier signal. Alternatively, the carrier may be modulated after D/A converters 27, 28, or after complex mixer 472. For example, transmit signal 74 may be modulated prior to amplification by one or more power amplifier 586.

The programmable phase rotation size data 36 and the programmable counter size data 30 may be provided by the baseband processor 26, the processing circuitry 37 discussed previously, or a separate controller within the wireless device 500. The baseband processor 26 or processing circuitry 37 may be, for example, one or more suitably programmed microprocessors, microcontrollers, DSPs (digital signal processors), or other processing circuitry and may include associated memory that contains executable instructions that, when executed, cause the controller to carry out the operations described herein. In addition, the baseband processor 26 or processing circuitry 37, as used herein, includes discrete logic, state machines or any other suitable combination of hardware, software and/or firmware. For example, processing circuitry 37 includes at least one processing device, such as a microprocessor, as associated memory having stored therein instructions executable by at least one processing device that causes the processing device to perform the functions described.

According to another embodiment, the phase rotations of an M-phase PSK modulator may be dynamically software selectable such that the phase rotations may be selected to better accommodate changes in channel characteristics in real time. According to one exemplary embodiment, the modulator 10 may be programmed to provide phase angle rotations for a phase shift key system capable of different multiple phases. For example, any M-phase PSK modulation format may be supported where M represents the number of possible phases corresponding to the size of the symbol set. Additionally, a single modulator 10 may support multiple modulation formats and may support communications for multiple modulation formats in the wireless device 500. Additionally, the wireless device 500 capable of functioning in multiple modulation modes may benefit from the reduced size of using a single modulator 10 as opposed to using multiple dedicated modulators. Additionally, the reduction of circuitry required for a single programmable multi-mode modulator would decrease power consumption for the wireless device.

In addition, the amount of phase rotation in rotated in-phase data 20 and rotated quadrature data 22 may dynamically vary while the modulator 10 is receiving a continuous stream of symbol data 24 in order to communicate with a different communication system employing a different modulation format. For example, a wireless device 500 may be capable of communicating with different communication systems employing different modulation formats either during a communication session such as during a telephone call, or such as when entering one communication system from another communication system having a different modulation format. Other advantages realized by dynamically changing modulation formats will be recognized by those with ordinary skill in the art.

As such, the above devices and methods provide the generation of rotated in-phase data 20 and rotated quadrature data 22 such that substantially less spectral bandwidth is required. Less spectral bandwidth is required because substantially fewer zero crossings occur on a constellation phase map for sequentially adjacent rotated in-phase data and rotated quadrature data 22. Additionally, the peak to average power and the peak to minimum signal power is reduced when compared to unrotated in-phase data 50 and unrotated quadrature data 52. As a result, the linearity requirements for power amplifier 86 are less if zero crossings do not occur than if zero crossings occur on a constellation phase map.

It will be understood that the implementation of other variations and modifications of the invention and its various aspects will be apparent to those with ordinary skill in the art and that the invention is not limited by this specific embodiment as described. It is therefore contemplated to cover by the present invention any and all modifications, variations or equivalents that fall within the spirit and scope of the basic underlying principles disclosed and claimed herein.

What is claimed is:

1. A modulator operative to produce rotated in-phase data and rotated quadrature data in response to receiving symbol data, the modulator comprising:
    a programmable symbol counter operatively responsive to the received symbol data to produce symbol count data based on programmable symbol counter size data; and
    symbol phase rotation logic operative to produce the rotated in-phase data and the rotated quadrature data in response to receiving at least the received symbol data, the symbol count data based on the programmable symbol counter size data, and programmable phase rotation size data.

2. The modulator of claim 1 wherein the symbol phase rotation logic produces substantially no zero crossings on a constellation phase map for sequentially adjacent rotated in-phase data and rotated quadrature data, based at least on the programmable phase rotation size data.

3. The modulator of claim 1 wherein the symbol phase rotation logic dynamically varies a phase rotation of the rotated in-phase data and a phase rotation of the rotated quadrature data in response to at least one of: a change in the programmable phase rotation size data, and a change in the symbol count data based on the programmable symbol counter size data.

4. The modulator of claim 1 wherein:
    the received symbol data includes a plurality of symbols wherein the symbol phase rotation logic represents each of the plurality of symbols as one of M possible phases, wherein M is an integer,
    the programmable symbol counter size data is based on at least M, and
    the programmable phase rotation size data is based on at least M.

5. The modulator of claim 4 wherein:
    each of the symbol data is represented as one out of at least eight possible phases,
    the programmable phase rotation size data is $3\pi/8$ radians, and the programmable symbol counter size data is at least sixteen.

6. The modulator of claim 1 wherein
the received symbol data includes a plurality of symbols, and
wherein the symbol phase rotation logic is operative to produce the rotated in-phase data and the rotated quadrature data in response to receiving each of: a corresponding symbol from the plurality of symbols, corresponding symbol count data based on the programmable symbol counter size data, and the programmable phase rotation size data.

7. The modulator of claim 1 wherein the symbol phase rotation logic further comprises:
a storage element, including data representing a storage element table containing at least the rotated in-phase data and the rotated quadrature data corresponding to the received symbol data, the symbol count data based on programmable symbol counter size data, and the programmable phase rotation size data; and
a table access circuit operative to produce the rotated in-phase data and the rotated quadrature data received from the storage element in response to the symbol data, the symbol count data based on programmable symbol counter size data, and the programmable phase rotation size data.

8. The modulator of claim 7 wherein the table access circuit produces substantially no zero crossings on a constellation phase map for sequentially adjacent rotated in-phase data and rotated quadrature data based at least on the programmable phase rotation size data.

9. The modulator of claim 7 wherein the table access circuit dynamically varies a phase rotation of the rotated in-phase data and a phase rotation of the rotated quadrature data in response to at least one of: a change in the programmable phase rotation size data, and a change in the symbol count data based on the programmable symbol counter size data.

10. The modulator of claim 7 wherein
the received symbol data includes a plurality of symbols, and
wherein the table access circuit is operative to produce the rotated in-phase data and the rotated quadrature data in response to receiving each of: a corresponding symbol from the plurality of symbols, corresponding symbol count data based on the programmable symbol counter size data, and the programmable phase rotation size data.

11. The modulator of claim 7 wherein the rotated in-phase data and quadrature data are in at least one of: a Cartesian coordinate system, and a polar coordinate system wherein each of the rotated in-phase data and the rotated quadrature data is represented as an angle.

12. The modulator of claim 7 wherein the storage element table further comprises:
a symbol to phase-angle lookup table comprises at least unrotated in-phase data and unrotated quadrature data corresponding to the received symbol data; and
a rotation coefficient lookup table comprises at least real rotation coefficient data and imaginary rotation coefficient data corresponding to the received symbol count data based at least on the programmable symbol counter size data,
wherein the table access circuit is operative to produce the rotated in-phase data and the rotated quadrature data in response to receiving the unrotated in-phase data and unrotated quadrature data from the symbol to phase-angle lookup table, and in response to receiving the real rotation coefficient data and the imaginary rotation coefficient data from the rotation coefficient lookup table.

13. The modulator of claim 12, comprising a multiplier operatively coupled to the table access circuit to multiply the unrotated in-phase data and the unrotated quadrature data with the real rotation coefficient data and the imaginary rotation coefficient data to generate the rotated in-phase data and the rotated quadrature data.

14. The modulator of claim 12 wherein the table access circuit dynamically varies a phase rotation of the rotated in-phase data and a phase rotation of the rotated quadrature data in response to at least one of: a change in the programmable phase rotation size data, and a change in the symbol count data based on the programmable symbol counter size data.

15. A wireless device comprising:
a baseband signal processor operative to produce symbol data;
a modulator operative to produce rotated in-phase data and rotated quadrature data in response to receiving symbol data, the modulator comprising:
a programmable symbol counter operatively responsive to the received symbol data to produce symbol count data based on at least programmable symbol counter size data;
symbol phase rotation logic operative to produce the rotated in-phase data and the rotated quadrature data in response to receiving: the received symbol data, the symbol count data based on at least the programmable symbol counter size data, and programmable phase rotation size data;
a transmitter operative produce a transmit signal in response to the rotated in-phase data and the rotated quadrature data; and
an antenna operative to receive the transmit signal.

16. The wireless device of claim 15 wherein the symbol phase rotation logic produces substantially no zero crossings on a constellation phase map for sequentially adjacent rotated in-phase data and rotated quadrature data based on the programmable phase rotation size data.

17. The wireless device of claim 15 wherein the symbol phase rotation logic dynamically varies a phase rotation of the rotated in-phase data and a phase rotation of the rotated quadrature data in response to at least one of: a change in the programmable phase rotation size data, and a change in the symbol count data based on the programmable symbol counter size data.

18. A method for producing rotated in-phase data and rotated quadrature data comprising:
receiving symbol data including a plurality of symbols;
producing symbol count data based at least on programmable symbol counter size data in response to receiving each of the plurality of symbols; and
producing the rotated in-phase data and the rotated quadrature data for each of the received plurality of symbols in response to receiving at least the symbol count data based at least on the programmable symbol counter size data, and programmable phase rotation size data.

19. The method of claim 18 wherein substantially no zero crossings occur on a constellation phase map for sequentially adjacent rotated in-phase data and rotated quadrature data based at least on the programmable phase rotation size data.

20. The method of claim 18 wherein producing a symbol count based at least on programmable symbol counter size data in response to receiving each of the plurality of symbols, further comprising the steps of:
counting each of the received plurality of symbols to produce corresponding symbol count data;

comparing the symbol count data to the programmable symbol counter size data;

resetting the symbol count data to an initial symbol count value if the symbol count data is equal to the programmable symbol counter size data; and incrementing the symbol count data if the symbol count data is not equal to the programmable symbol counter size data.

21. The method of claim 18 including the step of:

dynamically varying a phase rotation of the rotated in-phase data and a phase rotation of the rotated quadrature data in response to at least one of: a change in the programmable phase rotation size data, and a change in the symbol count data based on the programmable symbol counter size data.

* * * * *

UNITED STATES PATENT AND TRADEMARK OFFICE
CERTIFICATE OF CORRECTION

| | |
|---|---|
| PATENT NO. | : 7,412,008 B2 |
| APPLICATION NO. | : 10/610116 |
| DATED | : August 12, 2008 |
| INVENTOR(S) | : Nickolai J. Iliev |

It is certified that error appears in the above-identified patent and that said Letters Patent is hereby corrected as shown below:

On the cover page, item (75) please delete: "Nickolai J. Lliev" and replace with the following:
--Nickolai J. Iliev--

Signed and Sealed this

Twenty-fifth Day of May, 2010

David J. Kappos
*Director of the United States Patent and Trademark Office*